United States Patent
Doderer et al.

(10) Patent No.: US 6,534,994 B1
(45) Date of Patent: Mar. 18, 2003

(54) TRANSDUCER AND METHOD FOR PRODUCING THE SAME

(75) Inventors: Klaus Doderer, Neuenburg (DE); Ralf Lein, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/581,875

(22) PCT Filed: Nov. 12, 1998

(86) PCT No.: PCT/DE98/03313

§ 371 (c)(1),
(2), (4) Date: Aug. 3, 2000

(87) PCT Pub. No.: WO99/32855

PCT Pub. Date: Jul. 1, 1999

(30) Foreign Application Priority Data

Dec. 20, 1997 (DE) .................................... 197 57 006

(51) Int. Cl.[7] ................................................. G01B 7/30
(52) U.S. Cl. ..................................... 324/500; 324/207.2
(58) Field of Search ................................. 324/166, 174, 324/251, 252, 500, 207.2; 427/98, 123

(56) References Cited

U.S. PATENT DOCUMENTS

| 4,994,739 A | * | 2/1991 | Honda et al. | 324/173 |
| 5,004,980 A | * | 4/1991 | Ida et al. | 324/166 |
| 5,124,175 A | | 6/1992 | Hirsch | 427/98 |
| 5,543,378 A | * | 8/1996 | Wang | 423/445 B |
| 5,585,560 A | * | 12/1996 | Goossens | 324/166 |
| 5,821,744 A | * | 10/1998 | Shinjo et al. | 324/207.2 |

FOREIGN PATENT DOCUMENTS

| DE | 38 27 937 A1 | 2/1990 |
| EP | 0 655 609 A | 5/1995 |
| FR | 2 683 315 A | 5/1993 |
| WO | 97 22847 | 6/1997 |

OTHER PUBLICATIONS

Patent Abstract of Japan vol. 011, No. 242 (C–438, Aug. 7, 1987 & JP 62 050475 A, Mar. 5, 1987.

* cited by examiner

Primary Examiner—Christine Oda
Assistant Examiner—Vincent Q. Nguyen
(74) Attorney, Agent, or Firm—Michael J. Striker

(57) ABSTRACT

A measurement pickup is proposed, which has a sensor element for detecting a measurement value that is applied to a carder part (2) and has an electronic measurement circuit (4) for the measurement value detected. The sensor element (3), measurement circuit (4), contact pins (8) and connecting lines (9, 10, 11) are mounted on a carrier part (2), and the carder part (2, 7) comprises a palladium-filled plastic body, onto which conductor tracks (9, 10, 11) for forming the connecting lines can be mounted galvanically at the predetermined locations.

Figure 3:
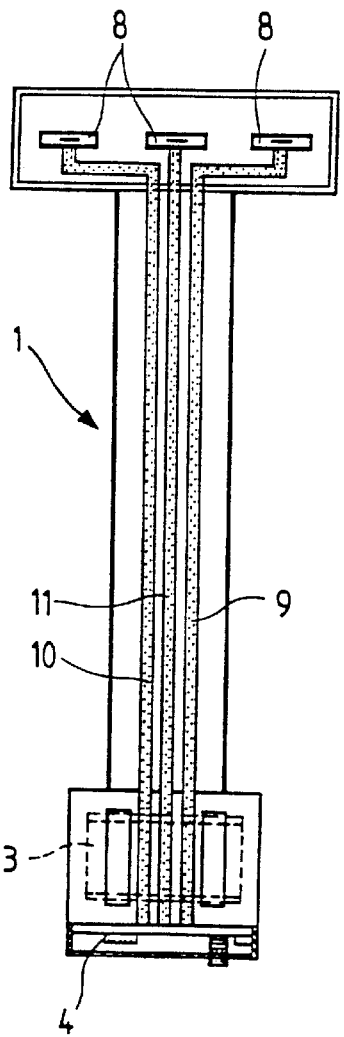

6 Claims, 2 Drawing Sheets

TRANSDUCER AND METHOD FOR PRODUCING THE SAME

BACKGROUND OF THE INVENTION

The invention relates to a measurement pickup, in particular an electric measurement pickup, for motions of a mechanical part, and to a method for producing it.

In a measurement pickup known from German Patent Disclosure DE 38 27 937 A1, a measurement circuit with a sensor element is disposed on carrier parts and surrounded by a housing. The housing is a caplike connection part, which receives on end of a connection cable. The caplike connection part, which forms a first carrier part, receives a second carrier part, which together with a fourth carrier part receives a third carrier part and is positioned relative to the first carrier part.

The electronic measurement circuit is disposed between the third carrier part and the fourth carrier part in a chamber and is cast with a casting composition. This electronic circuit is connected to a line segment that extends between the second and fourth carrier parts toward the sensor element. In the region of the sensor element, toward the second and fourth carrier part, a further carrier part is disposed, which receives the sensor element. The housing at least partly surrounds the second, third, fourth and one further carrier part and engages the first carrier part, which is embodied as the caplike connection part. To enable to measurement pickup to be disposed in its intended position, a further carrier part is provided, which has a bore for receiving the housing and which carries the measurement pickup therein.

This kind of embodiment of an electric measurement pickup has the disadvantage above all that, as described above, many carrier parts are needed for receiving the measurement circuit and creating an electric connection between the sensor element and the connection cable by means of electric connecting lines. This requires a complicated embodiment of the numerous carrier parts and thus entails high tool costs. Furthermore, assembly is expensive because of the high number of carrier parts. Another factor is that because of the complicated design of the carrier parts and the attendant compulsory order of assembly, there is a high rate of defects in terms of the operability of an electric measurement pickup of this kind.

ADVANTAGES OF THE INVENTION

The measurement pickup of the type defined at the outset is advantageously refined by the characteristics of the invention recited in the main claim, because a simple, compact design is thereby made possible. In a simple way, the sensor element, measurement circuit, contact pins and connecting lines are all mounted on a single carrier part. According to the invention, the carrier part comprises a palladium-filled plastic body, onto which conductor tracks for forming the connecting lines can be applied galvanically at predetermined locations.

In an alternative version of the measurement pickup, the sensor element, measurement circuit and connecting lines are mounted on a first carrier part; the contact pins are mounted on a further carrier part. Once again, the first carrier part comprises a palladium-filled plastic body, onto which conductor tracks for forming the connecting lines can be applied galvanically at predetermined-locations. With this two-piece version of the carrier part, versions of the measurement pickup of different length can be realized in a simple way, since the further carrier part with the contact pins can be mounted separately on the first carrier part. The contact pins in both cases can be applied galvanically by means of a layer of copper or tin, or can be made by a metal inlay part.

To embody the measurement pickup as a phase transducer for detecting the rotary angle in a mechanical arrangement, the sensor element is for instance formed of a magnet cast integrally into or fastened in the carrier part, and with a Hall element as a component of the measurement circuit, any influence on the magnetic field by a rotating part is detected.

The production of the measurement pickup of the invention can in particular be simplified by providing that separate electronic components and/or integrated electronic circuits can be applied directly to the surface of the carrier part for the sensor element. The electrical terminals can especially advantageously be made by reflow soldering or bonding to the locations of the surface of the carrier part that function as conductor tracks.

It is also especially advantageous if the connecting lines, in particular in the longitudinal direction between the sensor element and the contact pins, have corrugations on the surface of the carrier part, to allow longitudinal expansion. As a result, a temperature-related expansion of the carrier part can be compensated for in a simple way.

In an especially advantageous production method, in a first method step in a molded interconnected device (MID) production process, the palladium-filled carrier part is cast by injection molding. In a second method step, a protective plastic coating is sprayed onto those regions of the carrier part where no electrically conductive connections are to be created. In a third method step, the connecting lines are applied galvanically onto the surface of the carrier part, thus forming the conductor tracks.

In a fourth method step, the sensor element and the measurement circuit are applied. For instance, the magnet can be kept spaced apart with ribs and can be mounted positionally fixed in the carrier part. The thus-mounted components can be further covered, adhesively bonded, or hot-calked in the region of the sensor element with a plastic or ceramic lid. Next, in a fifth and final method step the entire arrangement is spray-coated with plastic.

DRAWINGS

Figure 2:
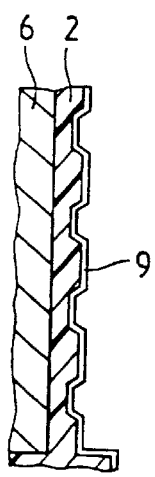
Figure 1:
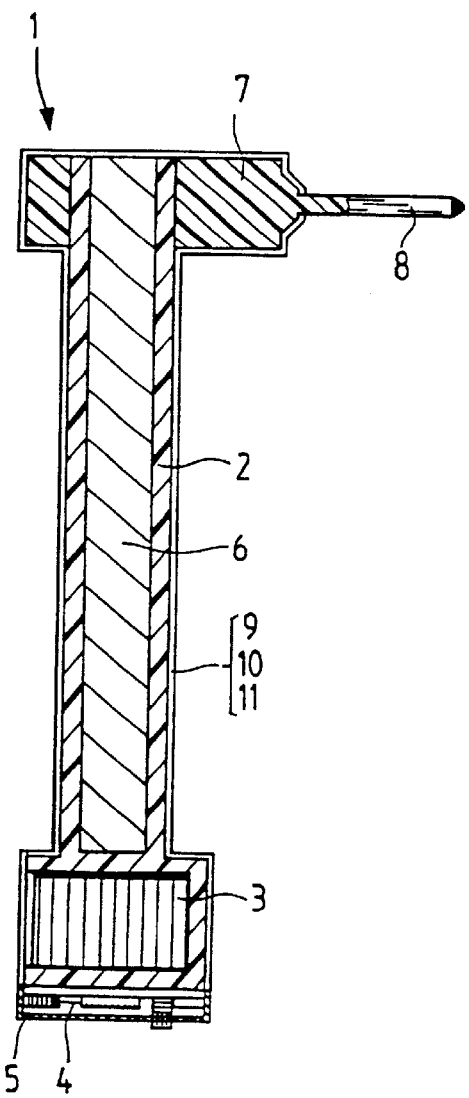
Figure 4:
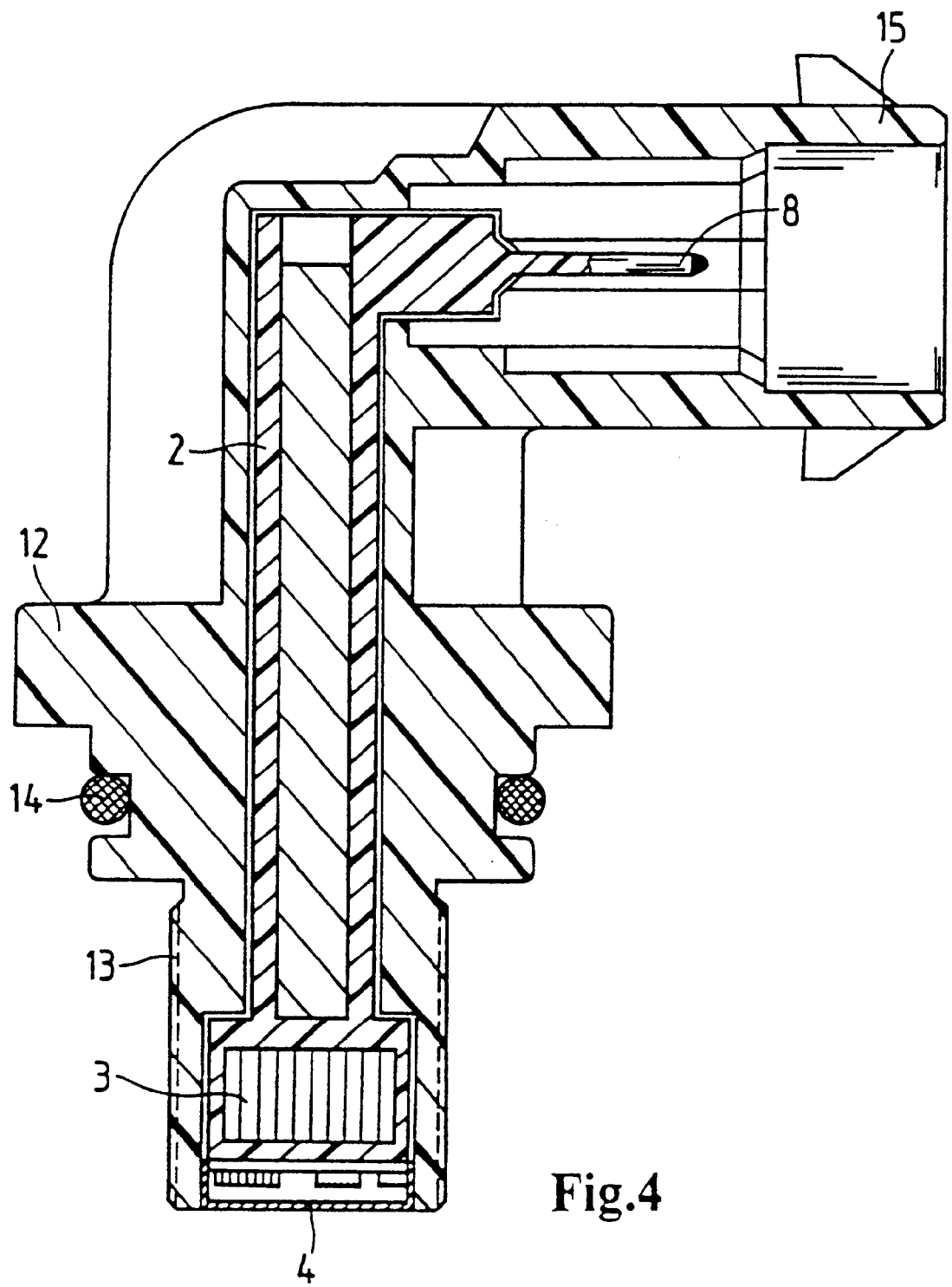

Exemplary embodiments of the measurement pickup according to the invention will be described in conjunction with the drawing. Shown are:

FIG. 1, a section through a measurement pickup with a carrier part for the sensor element and a further carrier part for the contact element;

FIG. 2, a detail showing corrugated conductor tracks on the carrier part;

FIG. 3, a view of the measurement pickup of FIG. 1 from the front, looking toward the contact pins; and FIG. 4, a section through a measurement pickup with a one-piece carrier part for the sensor element and for the contact element, with a plastic spray-coating as a housing.

DESCRIPTION OF THE EXEMPLARY EMBODIMENT

In FIG. 1, a measurement pickup 1 is shown which can be used a phase transducer for a rotary angle measurement, or as an rpm sensor, for instance in motor vehicles. The measurement pickup 1 has a carrier part 2, which is cast in the required shape from a palladium-filled plastic composition.

In the lower part of the carrier part 2, a magnet 3, as a component of a sensor element, and a measurement circuit 4 operating in a manner known per se, which is closed with a ceramic cap 5, are disposed. For reasons of cost, a simple filler composition 6, optionally even a nonferrous metal, can be placed in the interior of the carrier part 2. In this exemplary embodiment, a further carrier part 7 is disposed on the upper end of the carrier part 2 and carries the contact pins 8 for an external connection cable, not shown here.

On the carrier parts 2 and 7, conductor tracks 9, 10 and 11 are applied as connecting lines between the measurement circuit 4 and the contact pins 8, by a so-called "molded interconnected device (MID)" production process. The conductor tracks 9, 10 and 11 can preferably also be corrugated, as shown in detail in FIG. 2. The location of these connecting lines 9, 10 and 11 on the carrier parts 2 and 7 can be seen in FIG. 3, in a view of the measurement pickup 1 from a different direction.

In the aforementioned MID production process, the palladium-filled carrier part 2 or 7 is first cast by injection molding. In a second method step, the regions of the carrier part where no conductor tracks 9, 10 or 11 are to be created are sprayed with a plastic protective coat. In a third method step, the conductor tracks 9, 10 and 11 are then galvanically applied to the non-spray-coated surface of the carrier part 2 and 7.

In a fourth method step, the magnet 3, as part of the sensor element, and the measurement circuit 4 are applied. For instance, the magnet 3 can be kept spaced apart with ribs and can be mounted positionally fixed in the carrier part 2. The thus-mounted components 3 and 4 are covered in this exemplary embodiment with a clipped-on ceramic lid 5, and in a fifth and final method step, the entire arrangement is spray-coated with plastic, for instance with PA6.6GF35.

In the exemplary embodiment of FIG. 4, only one carrier part 2 is present, which has the magnet 3 and the measurement circuit 4 in its lower part and the contact pins 8 in its upper part. Otherwise, the exemplary embodiment of FIG. 4 is identical to the exemplary embodiment of FIG. 1. The housing 12 as the product of the plastic spray-coating can also be seen in FIG. 4. This housing 12 can be mounted, for instance via a thread 13 and a sealing ring 14, in the region of a rotating part in a motor vehicle. A caplike connection part 15 here assures that external connection cables can be connected to the contact pins 8 in the upper region of the carrier part 2 in a protected way.

What is claimed is:

1. Transducer, comprising a housing (10), which encloses the following components:
   a sensor element (3) attached to a support part (2) for sensing a measured value;
   an electronic measuring circuit (4) for the sensed measured value;
   a contact element attached to a support part (2, 7) and having contact pins (8) for the passing on the electrical output signals;
   electrical connecting lines (9, 10, 11) between the sensor element, the measuring circuit (4) and the contact pins (8); and
   a plastic encapsulation as the housing (12) for the components with the sensor element (3), the measuring circuit (4), the contact pins (8) and the connecting lines (9, 10, 11) being attached to a support part (2), the support part (2, 7) comprising a body of plastic which is filled with palladium and to which conductor tracks (9, 10, 11) can be electrodeposited at predetermined locations for forming the connecting lines, and the sensor element comprising a magnet (3) molded or clamped into the support part (2, 7) and a Hall element.

2. Transducer according to claim 1, wherein separate electronic components and/or integrated electronic circuits are applied directly to a surface of the support part (2, 7) for the sensor element (3), wherein the electrical connections are produced by reflow soldering or bonding to the predetermined locations of the surface of the support part (2, 7) acting as conductor tracks (9, 10, 11).

3. Transducer according to claim 1, wherein the connecting lines (9, 10, 11) have waves to permit longitudinal extension in a longitudinal direction between the sensor element (3) and the contact pins (8) on a surface of the support part (2).

4. Transducer comprising a housing (12), said housing enclosing the following components:
   a sensor element (3) attached to a support part (2, 7) for sensing a measured value;
   an electronic measuring circuit (4) for the measured value;
   a contact element attached to a support part (2, 7) and having contact pins (8) for passing on of electrical output signals;
   electrical connecting lines (9, 10, 11) between the sensor element (3), the measuring circuit (4) and the contact pins (8); and
   a plastic encapsulation as the housing (12) for the components, with the sensor element (3), the measuring circuit (4), the contact pins (8), and the connecting lines (9, 10, 11) being attached to a first support part (2) and the contact pins (8) being attached to a further support part (7), the support parts (2, 7) comprising a body of plastic which Is filled with palladium and to which conductor tracks (9, 10, 11) can be electrodeposited at predetermined locations for forming the connecting lines, and the sensor element comprising a magnet (3) molded or clamped into the first support part (2) and a Hall element.

5. Transducer according to claim 4, wherein separate electronic components and/or integrated electronic circuits are applied directly to a surface of the first or further support part (2, 7) for the sensor element (3), wherein the electrical connections are produced by reflow soldering or bonding to said predetermined locations of the surface of the first or further support part (2, 7) acting as conductor tracks (9, 10, 11).

6. Transducer according to claim 5, wherein the connecting lines (9, 10, 11) have waves to permit longitudinal extension in a longitudinal direction between the sensor element (3) and the contact pins (8) on a surface of the first support part (2).

* * * * *